United States Patent [19]

Olinger et al.

[11] Patent Number: 5,017,400

[45] Date of Patent: May 21, 1991

[54] NON-CARIOGENIC SWEETENER

[75] Inventors: Philip M. Olinger, St. Charles, Ill.; Christof Krüger, Hamburg, Fed. Rep. of Germany

[73] Assignee: Suomen Xyrofin Oy, Kotka, Finland

[21] Appl. No.: 205,457

[22] Filed: Jun. 10, 1988

[51] Int. Cl.$^5$ ............................................. A23G 1/00
[52] U.S. Cl. .................................... 426/660; 426/804; 426/658; 426/548; 426/613; 426/3
[58] Field of Search ............... 426/658, 804, 548, 660, 426/3.6, 613

[56] References Cited

U.S. PATENT DOCUMENTS

| | | | |
|---|---|---|---|
| 3,741,776 | 6/1973 | Mitsuhashi et al. | 426/599 |
| 3,915,736 | 10/1975 | Oyamada | 426/658 |
| 3,918,986 | 11/1975 | Hiraiwa | 127/29 |
| 4,217,368 | 8/1980 | Witzel et al. | 426/3 |
| 4,238,475 | 12/1980 | Witzel | 426/3 |
| 4,248,895 | 2/1981 | Stroz et al. | 426/658 |
| 4,408,041 | 10/1983 | Hirao et al. | 426/658 |
| 4,725,387 | 2/1988 | Hirao | 426/658 |
| 4,789,559 | 12/1988 | Hirao et al. | 426/658 |
| 4,792,453 | 12/1988 | Reed et al. | 426/5 |

OTHER PUBLICATIONS

Gelardi, R. C. the Multiple Sweetener Approach and New Sweeteners on the Horizon, Food Tech., Jan. 1987, pp. 123-124.

*Primary Examiner*—Jeanette Hunter
*Attorney, Agent, or Firm*—Kenyon & Kenyon

[57] ABSTRACT

The present invention is directed to edible compositions containing a sweetener combination of xylitol and maltitol. This combination exhibits sweetness synergism. It also lacks the undesired burning aftertaste of pure xylitol, has a substantial cooling effect and avoids set-up problems. The compositions range from confections such as chewing gum, chocolate and hard candy to dietetic foods.

9 Claims, No Drawings

NON-CARIOGENIC SWEETENER

FIELD OF THE INVENTION

The present invention relates to a sweetener composition which contains as principal ingredients from about 10 to about 90% by weight of crystalline maltitol and from about 90 to about 10% by weight of crystalline xylitol. The sweetener composition is utilized to sweeten sugarless products such as chocolate, chewing gum, hard candy, sugar-free confectionery products and dietetic products. The sweetener composition is noncariogenic and in some instances, cariostatic (caries inhibiting).

BACKGROUND OF THE INVENTION

The Food and Drug Administration Sugar Task Force indicated in its 1986 report on the "*Evaluation of Health Aspects of Sugars Contained in Carbohydrate Sweeteners*" that:

1. the consumption of sucrose and fermentable carbohydrates facilitates the development of plaque, dental caries and periodontal disease, and;
2. the present level of the consumption of sugar within the United States contributes significantly to caries incidence.

In addition to the need to reduce caries incidence, sugar-free confections can be of benefit to those individuals who must regulate their blood glucose and insulin levels. As such, sugar-free confections can benefit certain classes of diabetics.

There are several sugar substitutes which offer potential advantages in the formulation of sugarless confectionery products. Some examples include sorbitol, mannitol, aspartame, saccharine, cyclamate, and of particular note, the sugar alcohol sweeteners xylitol and maltitol.

Xylitol is the sweetest sugar alcohol. It is isosweet to sucrose, and as such, has a sweetness equivalent of 1 0. When utilized in the crystalline form in confectionery applications such as chocolate, chewing gum, re-crystallized candies, and the like a significant cooling effect (temperature lowering effect) is observed as the xylitol dissolves in the mouth. It results from the negative heat of solution for xylitol which is greater than that of all other sugar substitutes.

Xylitol metabolism is independent of insulin. Consequently, xylitol is also a suitable sweetener for the non-insulin dependent (Type II) diabetic.

Many clinical and field studies have demonstrated that sugar-free confections sweetened with xylitol in total or in part, exhibit a cariostatic or caries inhibiting quality. Bumlr, A.: "Caries Prevention with Xylitol" *World Review of Nutrition and Dietetics* 55:183-209 (1988); "Caries Prevention With Xylitol" *Dental Dialogue*. A Symposium at the University of Michigan at Ann Arbor (1988). Xylitol sweetened confections have also been shown to alter the polysacoharide composition of plaque—making it less adhesive—and to aid in the reduction of plaque. Soderling, E. et al: "Effect of Sorbitol, Xylitol and Xylitol/Sorbitol Chewing Gums on Dental Plaque", presented at International Association for Dental Research, Montreal (1988). Further, xylitol inhibits the growth of *Streptococcus mutans*—the major oral bacteria responsible for tooth decay. As such, xylitol is not merely a non-caries causing (noncariogenic) sweetener. Xylitol is an active dental protector.

Maltitol exhibits a lower hygroscopicity than xylitol and a cooling effect (from the negative heat of solution) which is only 15% that of xylitol. In solution, maltitol exhibits a higher viscosity than xylitol at equivalent concentration. The osmotic pressure created by maltitol uptake is notably less than that of xylitol and is similar to that of sucrose. The sweetness equivalent of maltitol is about 0.8–0.9. As such, maltitol is approximately 80-90% as sweet as xylitol.

Because maltitol is not fermented by most oral microflora and a minimal pH drop occurs following its consumption, maltitol can be considered to be a non-cariogenic sweetener. It is not fermented by *Streptococcus mutans*, but is fermented by *Lactobacillus case*.

Consumption of maltitol does not produce significant increases in either blood glucose or insulin levels. Maltitol, like xylitol, is a suitable sweetener for the non-insulin dependent (Type II) diabetic.

There are drawbacks associated with the use of either xylitol or maltitol as a sole sweetener, however. With regard to maltitol, its reduced cooling effect in sweetened confectionery products such as chewing gum or mint chocolates can lead to consumer dissatisfaction. And, its reduced sweetness equivalent can lead to confectionery products with insufficient sweetness (chocolate, chewing gum and other confections). With regard to xylitol, its higher osmolality can produce a burning after-taste in the back of the mouth when it is used as the sole sweetener in chocolates and certain other confectionery products. Moreover, its lower viscosity and its low molecular weight can cause poor setting properties in confectionery products such as hard or soft candies or in candies which are subject to cold flow and poor shelf stability.

Therefore, it is an object of the invention to develop a polyol sweetener that is isosweet with sucrose yet does not develop the burning after-taste of xylitol. Another object is the development of a polyol sweetener wherein the cooling effect is modulated to produce the desired sensorical impression. Yet other objects include development of shape retaining properties in formulations of hard and soft candies and development of a cariostatic and/or caries-inhibiting function onto sugar-free confections.

SUMMARY OF THE INVENTION

These and other objects are achieved by the present invention which is directed to edible compositions sweetened with a sweetener combination of xylitol and maltitol. The sweetener combination can range from about 10–90% by weight of a maltitol product having a maltitol purity of more than 80% and about 90–10% by Weight of xylitol the weight percents being relative to the total weight of the combination. The sweetener combination can compose 98 percent by weight of the edible composition or less. Embodiments of the composition include confections characterized by their fresh taste, lack of a burning after-taste and shape-retaining properties. Preferable portions of sweetener combination in the confections will range from about 25% to 98%. Preferred embodiments include chewing gums, chocolates, chewy candies, hard candies, fondants and pastilles. Further embodiments of the composition include dietetic baked goods such as cakes, cookies, cookie filling, marangue and the like. Preferred portions of sweetener combination in the dietetic baked goods will range from about 5 to 70%.

Certain edible compositions may tend to exhibit a burning after-taste if they are sweetened soley with xylitol. For these edible compositions the sweetener portion is preferably composed of from about 10 to about 50 percent xylitol and from about 90 to about 50% maltitol. In such compositions, e.g. chocolates, it is especially preferred to formulate with a sweetener comprised of about 10-30 percent xylitol with a remainder of maltitol. Use of greater than 50 percent xylitol can tend toward development of the burning after-taste under these circumstances.

Certain edible compositions may tend to exhibit insufficient setting properties or a tendency toward cold flow, if they contain a high range of xylitol alone and little other bulking or shape retaining agents. For these edible compositions, e.g. boiled hard candies and chewy candies, the sweetener portion preferably is composed from about 10 to about 35 percent xylitol, and about 90 to about 65 percent maltitol. When prepared with a sweetener of more than about 35 percent xylitol boiled hard candies can exhibit cold flow, stickiness and poor shelf stability. However, certain formulation techniques such as recrystallization can be used to prepare such hard candy compositions wherein xylitol represents up to about 88% of the sweetener portion of the composition.

Certain edible compositions may tend to exhibit insufficient freshness if they are sweetened solely with maltitol, e.g. chewing gums and mints. For these compositions, it is preferrable to formulate with a sweetener containing at least 10% xylitol with the remainder being maltitol.

The invention as well is directed to a polyol-type sweetener for use in or on food products. The sweetener is composed of an mixture of about 10-90% by weight of a maltitol product having a maltitol purity of more than about 80% and about 90-10% by weight of xylitol. This sweetener is non-cariogenic.

Cariostatic and/or caries-inhibiting properties will be found in all of the foregoing embodiments of the invention. It is preferable that about 5-10 percent of the composition be sweetened with xylitol in order to develop these properties.

DETAILED DESCRIPTION OF THE INVENTION

This invention is directed to edible compositions composed of a sweetener combinations of xylitol and maltitol in varying ratios. These compositions exhibit surprising effects by which the particular drawbacks of the individual polyols are overcome. Surprisingly, a sweetness synergism results from this sweetener combination. Moreover, the lack of cooling effect and reduced dental benefits attributable to maltitol are overcome by the xylitol present. The cooling effect can as well be modulated by variation of the xylitol to maltitol ratio so as to achieve the desired sensorial impression. And, the undesired burning after-taste and lack of set-up and cold flow problems attributable to xylitol are overcome by the presence of maltitol.

The xylitol used in the sweetener combination is a five-carbon sugar alcohol found naturally in many fruits and vegetables (such as raspberries, strawberries, yellow plums, lettuce and cauliflower) at level of 1% or less. The human body produces about 5-15 grams of xylitol per day during normal metabolism. The xylitol is produced from hemicellulose sources and is available commercially in the crystalline form. The nominal purity of crystalline xylitol is equal to or greater than 98.0%.

Maltitol (4- O -alpha- D - glucopyranosyl - D -glucitol) as used in the sweetener combination, is composed of a molecule each of glucose and sorbitol, and is obtained by hydrogenation of the disaccharide maltose. To produce the maltitol, corn, potato or other vegetable starch is enzymatically converted to a high maltose syrup containing maltose levels in excess of about 80%. The maltose syrup can then be hydrogenated to form a maltitol syrup containing in excess of about 80% maltitol. The resulting maltitol syrup is crystallized to form a crystalline product containing about 80-95% maltitol and about 5-20% other polyols such as maltotriitol, sorbitol and high molecular weight polyols. Alternatively, maltitol may be produced in a higher purified crystalline form by additional refining to a purity of about 95-100% maltitol.

The preferred crystalline maltitol used in the present invention is the purified product with a purity of 95-100% maltitol. Alternatively, commercially available crystalline maltitol containing about 80-95% maltitol is also applicable.

In the usual methods of preparation of the compositions of the invention, the xylitol and maltitol are stored and handled as separate ingredients. Their combination occurs when they are mixed together with the other ingredients of the edible combination being prepared. Their ratios for addition are chosen so as to result in the final composition ratios given above. Generally these ratios range from 10-90% by weight xylitol relative to the weight of the combination and a remainder of maltitol. The amount of sweetener combination in the edible composition will vary according to the type being prepared. It generally will range from as little as 5-10% to as much as 80-98%.

The edible compositions of the invention are prepared through use of typical confectionery and dietetic baking recipes except that the sweetener combination is substituted in place of the sugar and other fermentible carbohydrates called for in the recipe. Since the sweetness and bulking properties of the sweetener combination approximate those of sugar, a direct weight-for-weight substitution can be made as a starting point. Modifications are made depending upon the desired sweetness, texture and other properties. In typical recipes, the xylitol and maltitol are individually added to the edible composition mixture as appropriate, and mixed to assure thorough combination. The individual sweetener ingredients can as well be precombined in the appropriate ratios and added to the edible composition as a mixture.

If the edible compositions may display tendencies toward a harsh after-taste when solely formulated with xylitol, it is preferred to formulate them with the preferred range of sweetener combinations mentioned above for such purposes. Examples of such edible compositions falling within this category include chocolates, chewy candies, pectin jellies, compressed mints, caramels, fudge, certain pastries and cookies with a wafer filling. Generally the sweetener combination will comprise about 30 to about 98% by weight of these confections.

If the edible compositions may display tendencies toward cold flow when solely formulated with non-recrystallized pure xylitol, it is preferred to formulate them with the range of sweetener combinations mentioned above for such purposes. Examples of such edible compositions falling within this category include hard candies, coughdrops, and lozenges for dispensing medicine. Generally, the sweetener combination will comprise about 25 to about 98% by weight of these confections.

Cariostatic and cooling effects will be developed by any of the edible compositions prepared from sweeteners covering the full range useful for xylitol and maltitol. Preferably, the composition will contain at least 10% xylitol in the sweetener portion in order to achieve these effects.

The edible compositions as well may encompass dietetic baked goods. These embodiments will contain the sweetener combination as a substitute for the sugars usually present. They also will exhibit enhanced crystalline surface texture. Examples include cookies, cakes, pies, fillings, cremes and the like. Generally the sweetener combination will comprise about 5 to about 70of these dietetic goods.

It has been found that an increased sweetness over that expected for the sweetener combinations in the edible compositions of this invention will be developed over the full range of percentages of xylitol and maltitol. Although the underlying theory for such a cooperative effect is not to be construed as a limitation of this invention, it is believed that a priority exists between the two substances when they cause a response of the receptor sites for taste in human physiology.

When it is desired to prepare the polyol-type sweetener of this invention, any of the typical preparatory techniques for combining two solids in mixture can be used. Milling, melting, blending, recrystallizing and extruding are some exemplary techniques. With any of these techniques, it is important to combine the solids so that the resulting mixture is substantially homogeneous.

The attributes of the sweetener of this invention are further illustrated in the following examples of chewing gums, chocolates, hard candies and dietetic cookies. These examples are not to be construed as limiting the scope of the invention set forth above.

EXAMPLE I

A series of chewing gums may be formulated with a gum base, gum arabic solution, flavor and varying amounts of the sweetener combination as well as pure xylitol and pure maltitol. The chewing gums can be prepared by heating the gum base to a temperature of about 55° C. followed by incremental addition of the respective sweeteners, plasticizers, emulsifiers and flavors while slowly kneading the gum base. Each formulation can then be evaluated to determine its properties. Table I sets forth the proposed specific sugar-free chewing gum formulations containing the sweetener combinations, as well as the actual formulations of gum sweetened solely with xylitol or maltitol that have been prepared.

Gum 1, containing 57% xylitol and 7% dry basis sorbitol, to have acceptable sweetness and an intense (but pleasant) cooling effect. Because the gum contains a sufficient amount of xylitol it can be considered to be both non-cariogenic and cariostatic. The computed sweetness index of the gum is about 60.5. Sweetness index is computed by multiplying the dry basis sweetener amount by the sweetness equivalent $[(57 \times 1.0) + (7 \times 0.5)]$.

Gums 2 and 3, containing 57% crystalline maltitol with noted respective purities and 7% dry basis sorbitol, were judged to have insufficient sweetness and a poor cooling effect. Further, the gums can be classified as non-cariogenic not cariostatic. The computed sweetness index of the gums is $[(57 \times 0.85) + (7 \times 0.5)]$ or about 52.0.

Gums 4 and 5, containing xylitol and maltitol in a ratio of about 1:5, are thought to have acceptable sweetness and a noticeably improved freshness or cooling effect if they would be compared with Gums 2 and 3. The gums will be non-cariogenic and begin to fall into the range of xylitol containing gums which have displayed cariostatic attributes. The computed sweetness index of Gums 4 and 5 is about 53.5.

The cooling effect of Gums 6 and 7 is also thought to be an improvement if compared to Gums 2–5 and slightly less than Gum 1.

Gums 8 and 9, containing xylitol and maltitol in ratios of about 5:1 and about 1:3 respectively, are also thought to have acceptable sweetness, a pleasing cooling effect and can be considered cariostatic.

TABLE I

| | SUGAR-FREE CHEWING GUM | | | | | | | | |
|---|---|---|---|---|---|---|---|---|---|
| | SUGAR-FREE CHEWING GUM Percent fresh basis | | | | | | | | |
| INGREDIENT | 1 | 2 | 3 | 4 | 5 | 6 | 7 | 8 | 9 |
| Gum base | 30 | 30 | 30 | 30 | 30 | 30 | 30 | 30 | 30 |
| Xylitol, crystalline milled | 57 | — | — | 10 | 10 | 32 | 32 | 47 | 15 |
| Maltitol (99%), cryst. milled | — | 57 | — | 47 | — | 25 | — | — | — |
| Maltitol (90%), cryst. milled | — | — | 57 | — | 47 | — | 25 | 10 | 42 |
| Sorbitol syrup (70%) | 10 | 10 | 10 | 10 | 10 | 10 | 10 | 10 | 10 |
| Glycerol | 1 | 1 | 1 | 1 | 1 | 1 | 1 | 1 | 1 |
| Gum arabic solution (50%) | 1 | 1 | 1 | 1 | 1 | 1 | 1 | 1 | 1 |
| Peppermint flavor | 1 | 1 | 1 | 1 | 1 | 1 | 1 | 1 | 1 |
| Sweetness | + | — | — | | | | | | |
| Cooling Effect | + | — | — | | | | | | |
| Non-Cariogenic | + | + | + | + | + | + | + | + | + |
| Cariostatic | + | — | — | ± | ± | + | + | + | + |

Code:
+ = sufficient
− = insufficient
± = notable

Note:
Although chewing gums 4–9 were not evaluated, sugar free chewing gums are generally recognized as being non-cariogenic, and chewing gums containing xylitol are recognized as being cariostatic.

EXAMPLE II

A series of chocolates were formulated with cocoa ingredients, milk derivatives and the sweetener combination or pure xylitol or maltitol. The sugar-free chocolates were prepared by melting the cocoa liquor and a portion of the cocoa butter and combining and mixing the sweetener, milk powder and vanillin with the melted cocoa mass. The mix was then refined to the required particle size. The mix was then conched for a period of about 16 hours at about 42° C. The remaining cococa butter and lecithin were then added to the conch and conching was continued for an additional two hours.

Table II sets forth the specific sugar-free milk chocolate formulations in which xylitol and maltitol were evaluated in different ratios as the added sweeteners.

Chocolate 1, containing 45.6% xylitol, was judged to have acceptable sweetness and a not desirable (objectionable) burning after taste in the back of the mouth. The computed sweetness index of Chocolate 1 is 45.6.

Chocolates 2 and 3, containing 45.6% crystalline maltitol with noted purities respectively, were judged to have insufficient sweetness. The taste of the respective chocolates was acceptable and there was no objectionable burning after taste. The computed sweetness index of the respective chocolates is about 38.8.

Chocolates 4 and 5, containing xylitol and maltitol in a ratio of about 1.5:8.5, were judged to have sufficient sweetness and no objectionable after taste. The computed sweetness index of the respective chocolates is about 39.8. The fact that Chocolates 4 and 5 display a sweetness similar to Chocolate 1 (computed sweetness index of about 45.6) further suggests a significant sweetness synergism when xylitol and maltitol are combined.

TABLE II

SUGAR-FREE MILK CHOCOLATE

| INGREDIENT | SUGAR-FREE MILK CHOCOLATE Percent fresh basis | | | | |
|---|---|---|---|---|---|
| | 1 | 2 | 3 | 4 | 5 |
| Xylitol, crystalline milled | 45.6 | — | — | 7.0 | 7.0 |
| Maltitol (99%), cryst. milled | — | 45.6 | — | 38.6 | — |
| Maltitol (90%), cryst. milled | — | — | 45.6 | — | 38.6 |
| Cocoa Liquor | 12.0 | 12.0 | 12.0 | 12.0 | 12.0 |
| Cocoa Butter | 24.0 | 24.0 | 24.0 | 24.0 | 24.0 |
| Full Cream Milk Powder | 18.0 | 18.0 | 18.0 | 18.0 | 18.0 |
| Lecithin | 0.4 | 0.4 | 0.4 | 0.4 | 0.4 |
| Vanillin | 0.02 | 0.02 | 0.02 | 0.02 | 0.02 |
| Sweetness | + | — | — | + | + |
| After Taste | P | N | N | N | N |

Code:
+ = sufficient
− = insufficient
P = present
N = not present

EXAMPLE III

A series of hard candies were prepared with the sweetener or pure xylitol or pure maltitol. These sugar-free hard candies were prepared by combining the sweetener combination (xylitol and maltitol) adding sufficient water to facilitate solution and transfer to a vacuum cooker and cooking of the resulting mix to 155-170~C under vacuum. The resulting mass was then cooled to about 140~C and the desired acidulant, flavor and color were added. The resulting mass was then either rolled or deposited.

Table III sets forth sugar-free boiled hard candy formulations in which xylitol and maltitol were evaluated at differing ratios as the confection sweetener.

Candy 1, sweetened entirely with xylitol, is illustrative of the fact that xylitol cannot be used as the sole sweetener. Sufficient hardening does not occur.

Candies 2 and 3, containing xylitol and maltitol in ratios of about 1:9, exhibit adequate set up time, a mass with sufficient plasticity to be either rolled or deposited and adequate shelf stability (no cold flow). Candies 4 and 5, containing xylitol and maltitol in ratios of about 1:4 and about 3:7 respectively, are further illustrative of our above mentioned discovery.

TABLE III

SUGAR-FREE BOILED HARD CANDY

| INGREDIENT | SUGAR-FREE BOILED HARD CANDY Percent fresh basis | | | | |
|---|---|---|---|---|---|
| | 1 | 2 | 3 | 4 | 5 |
| Xylitol, crystalline | 98 | 10 | 10 | 20 | 30 |
| Maltitol (99%), cryst. | — | 88 | — | — | — |
| Maltitol (90%), cryst. | — | — | 88 | 78 | 68 |
| Citric acid, cyrst. | 1 | 1 | 1 | 1 | 1 |
| Flavor/Color | q.s. | q.s. | q.s. | q.s. | q.s. |
| Set-Up | — | + | + | + | + |
| Shelf Stability | — | + | + | + | ± |

Code:
+ = sufficient
− = insufficient
± = marginal

EXAMPLE IV

A Dietetic Cookie

Using the following recipe, xylitol, maltitol, polydextrose, "Solka-Floc ®" product,[1] shortening, egg white solids, and "N-Flate ® product " may be combined in a mixing apparatus. A portion of water may then be added and the blend mixed to a cream-like texture. Leavening, vanilla powder, lemon extract and the remaining water are added to the blend and mixed until substantially homogeneous. Flour may gently be folded in and the resulting dough is formed into a roll. The roll may be cut into 0.25 inch thicknesses of about 2 inch diameter each and the resulting cookies placed on a baking sheet. Baking the dough at about 350° F. until golden brown will produce the dietetic cookies of the invention.

TABLE IV

A DIETETIC COOKIE

| INGREDIENT | BATTER, Percent, fresh basis |
|---|---|
| Xylitol, crystalline | 10.00 |
| Maltitol (90%), cryst. | 12.07 |
| General Purpose Flour | 22.05 |
| Polydextrose | 15.10 |
| "Solka Floc ®" product | 8.40 |
| Vegetable Shortening | 4.60 |
| "N-Flate ®" product | 4.19 |
| Egg White Solids | 2.79 |
| Lemon Extract | 0.34 |
| Vanilla Powder | 0.34 |
| Double Action Baking Powder | 0.37 |
| Water | 19.75 |

1 Solka-Floc ® product is crystalline cellulose sold by James River Corp.; N-Flate ® product is a balanced blend of emulsifier, gum, gum guar and modified food starch sold by National Starch, Inc.

What is claimed is:

1. A chocolate product comprising from about 5 to about 55% by weight of solid maltitol having a purity of at least 80% maltitol and about 55-5% by weight of solid xylitol, wherein said maltitol reduces the burning aftertaste and cooling effect of said xylitol in the chocolate product.

2. A chocolate product according to claim 1 comprising about 5-15% solid xylitol, about 30-45% solid maltitol having a purity of at least 80% maltitol, about 10-15% cocoa liquor, about 20-30% cocoa butter, about 10-20% full cream milk powder, about 0.1-1.0% lecithin, and about 0.05-0.3% vanillin.

3. A chocolate product according to claim 2 comprising about 10% solid xylitol, about 35-40% solid maltitol having a purity of at least 80% malitol, about 12% cocoa liquor, about 24% cocoa butter, about 18% full cream milk powder, about 0.4% lecithin, and about 0.1% vanillin.

4. A dark chocolate produce according to claim 1 comprising about 5-15% solid xylitol, about 30-45% maltitol having a purity of at least 80% maltitol, about 34-40% cocoa liquor, about 12-20% cocoa butter, about 0.1-1.0% lecithin and about 0.01-0.2% vanillin.

5. A dark chocolate product according to claim 4 comprising about 9% solid xylitol, about 39% maltitol having a purity of at least 80% maltitol, about 34-40% cocoa liquor, about 12-14% cocoa butter, about 0.5% lecithin and about 0.02% vanillin.

6. A process for reducing the burning aftertaste and cooling effect of xylitol in a chocolate product containing between about 5 and about 55% by weight of solid xylitol comprising formulating said xylitol-sweetened chocolate product to include from about 5 to about 55% by weight of solid maltitol having a purity of at least 80% maltitol.

7. A process for producing a xylitol and maltitol sweetened chocolate product, wherein the malitol reduces the burning aftertaste and cooling effect of said xylitol in the chocolate product comprising:

(a) combining together heated cocoa liquor and a portion of cocoa butter;
(b) mixing xylitol and maltitol with the ingredients of step (a) wherein the weight ratio of xylitol to maltitol is between 1:10 and 10:1;
(c) converting the mix of step (b) to a fine particle size;
(d) remelting of the fine mix of step (c).

8. A process according to claim 7 further comprising the step of (e) of conching the mix of step (d) at temperatures below about 60° C. for a period of about 15-20 hours.

9. A process according to claim 8 further comprising adding cocoa butter and lecithin with continued conching for an additional two hours after step (e).

* * * * *